United States Patent Office 3,647,586
Patented Mar. 7, 1972

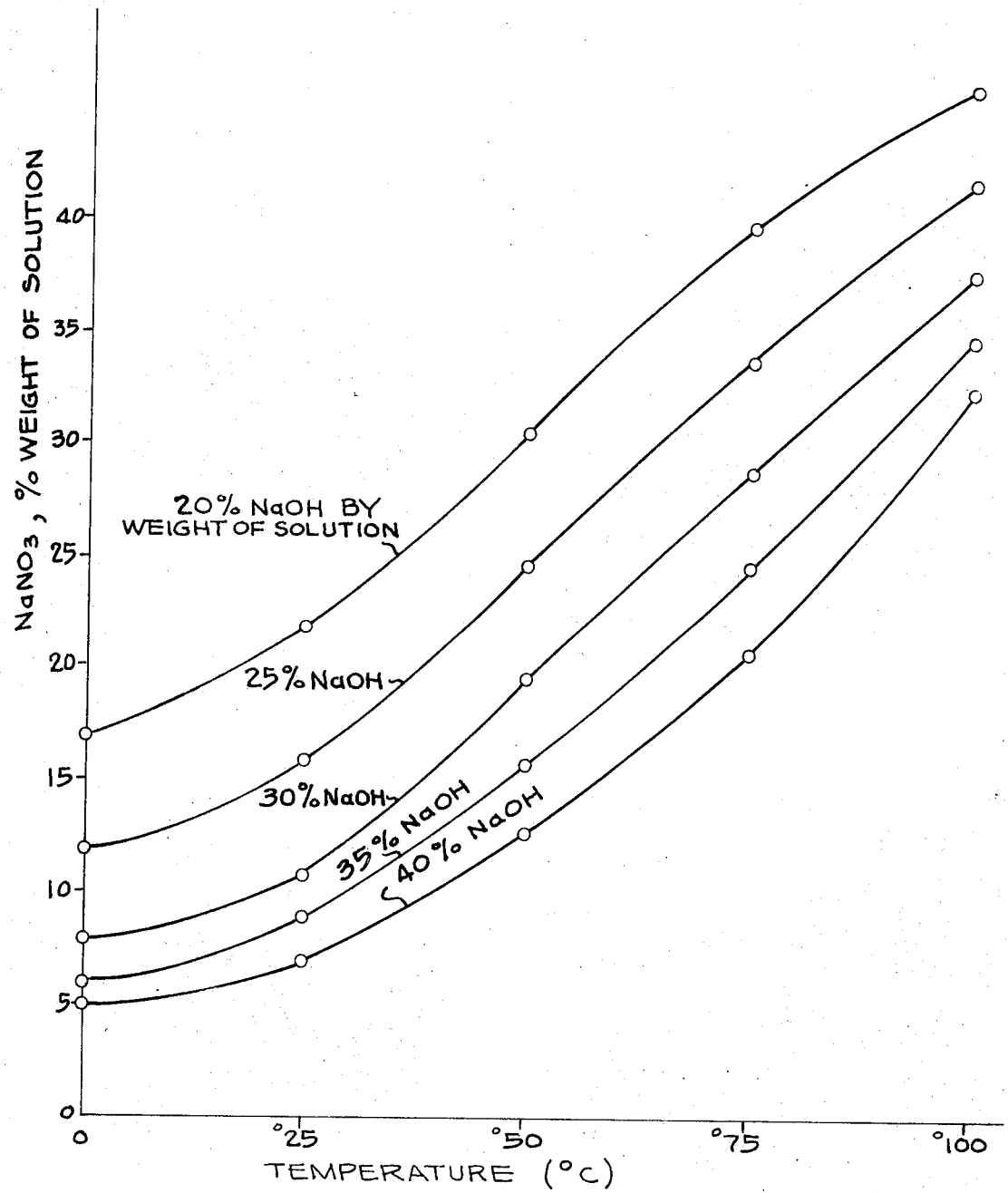

3,647,586
METHOD OF HYDRATING A BATTERY PLAQUE IMPREGNATED WITH METAL NITRATE IN A HYDROXIDE SOLUTION AND SUBSEQUENT RECOVERY OF NITRATE BYPRODUCT AS CRYSTALS
Bernard C. Bergum, Monona, and Per S. Svardal, Madison, Wis., assignors to ESB Incorporated
Filed Jan. 22, 1970, Ser. No. 4,824
Int. Cl. H01m 35/02
U.S. Cl. 136—20                                    6 Claims

ABSTRACT OF THE DISCLOSURE

A battery plaque impregnated with a metal nitrate is hydrated by being submerged in a hot, concentrated hydroxide solution to produce a metal hydroxide deposit in the plaque and a hydroxide solution containing a nitrate byproduct. The hydroxide solution containing the nitrate byproduct is transmitted to a crystallization tank where upon cooling nitrate crystals are formed and recovered. The solution remaining after crystallization may be returned to the hydration tank. Hydroxide solution may be added to maintain the hydroxide concentration in the hydration tank at a substantially uniform level. Both batch and continuous processing may be used.

BACKGROUND OF THE INVENTION

Two of the steps used in a previous batch process to construct cadmium, silver, cobalt, and nickel electrodes were to impregnate a conductive plaque with a nitrate of the one of these metals and then to submerge the impregnated plaque into a hot hydroxide solution, usually sodium or potassium hydroxide, to convert or "hydrate" the metal nitrate into a metal hydroxide. Subsequently, those plaques which were to the used as negative electrodes were "cycled" or "formed," converting the metal hydroxide into the metal.

The practice of carrying out the hydration step using a hot, concentrated hydroxide solution was essentially a compromise of a basic dilemma involving a concentration of the hydroxides in solution.

A high hydroxide concentration has the desirable result of producing very crystalline metal hydroxides in the plaque rather than the amorphous deposits which would occur using less concentrated solutions. The amorphous deposits are to be avoided because they plug the pores near the surface of the plaque and thereby prevent hydration of the interior metal nitrates and/or the subsequent removal of the nitrate byproducts from the interior of the plaque. Nitrates in the hydrated plaques are very detrimental to the ability of an electrode to retain a charge, and manufacturers take great effort to control the nitrate content to below 0.1% of the plaque including the active material.

Unfortunately a high hydroxide concentration may also have the undesired result of precipitating the resulting nitrate byproducts. At a given temperature the solubility of the nitrate byproducts decreases as the concentration of the hydroxide solution increases. Furthermore, the quantity of the precipitated nitrate byproducts, which are undesirable in the final electrode and which must ultimately be removed from the interior of the plaque, increases as the hydroxide concentration increases, aggravating the problems encountered when they are subsequently removed.

The high temperatures used during hydration to some extent offset or resolved the problems inherently related to the hydroxide concentration, for the hydration rate and penetration and the solubility of the nitrate byproducts both increase with increases in temperature.

The choice of a hot, concentrated hydroxide solution has therefore been essentially a compromise between the desire to get a rapid, deep penetration and the wish to remove nitrate byproducts of the hydration reaction from the interior of the plaques. An unfortunate characteristic of the previous batch process using hot, concentrated hydroxide solutions has been that concentrations were continuously changing throughout the hydration, the hydroxide concentration decreasing and the nitrate byproduct concentration increasing; in such a situation quality control becomes exceedingly difficult, since the crystalline structure of the metal hydroxide would change as the hydroxide concentration changed and since the content of the nitrate byproduct in the plaques should preferably be held to not more than 0.1%.

Finally, the problem of waste disposal was a serious limitation of the previous batch process. Since the hydroxide concentration continuously decreased and the nitrate byproduct concentration continuously increased, a point would eventually be reached where the hydration solution would have to be removed and replaced with new, fresh solution. Disposal of this nitrate-rich solution presented serious problems. Dumping of this waste liquid into lakes, ponds, streams, or rivers not only represented an economic loss of material, but additionally and importantly contributed to pollution of the water. Nitrates are one of the chief contributors to problems of water pollution, resulting in very rapid algae and weed growth that limits or destroys the usefulness of lakes and streams to man, fish, and wildlife. To reduce the growing menace of pollution various levels of government are increasingly requiring manufacturers to reduce the levels of nitrates in their waste disposal products, and this in turn sometimes requires redesign of manufacturing processes.

SUMMARY OF THE INVENTION

With this invention the pollution problems associated with nitrate disposal can be greatly reduced and practically eliminated, and the speed and quality control of the hydration process can be greatly improved, by passing the hydroxide solution containing the nitrate byproduct from the hydration tank into a crystallizing tank, cooling the solution to produce nitrate crystals, removing the nitrate crystals from the crystallizing tank, and removing the remaining solution from the crystallizing tank. The solution remaining in the crystallizing tank after the nitrate byproduct has been crystallized can be either returned to the hydration tank for reuse or it can be dumped as a less polluting waste product. If the solution is returned to the hydration tank from the crystallizing tank the rate of crystal formation may be adjusted to be at a rate which will exactly balance the rate at which nitrate byproducts are produced in the hydration tank, thus keeping a uniform nitrate concentration in the hydration tank. The invention may be used with both batch and continuous processing.

The preferred embodiment of the invention is a continuous process in which the solution from the crystallizing tank is returned to the hydration tank for reuse and in which additional hydroxide is supplied to the hydration tank to maintain the hydroxide concentration in the tank at a substantially uniform level.

The invention may be used with plaques impregnated with nitrates of various metals, including those of cadmium, silver, cobalt, and nickel.

BRIEF DESCRIPTION OF THE DRAWINGS

FIG. 2 shows the solubilities of sodium nitrate in sodium hydroxide at different temperatures and different concentrations of hydroxide solutions. FIG. 2 shows that for a given concentration of NaOH, the maximum content of the NaNO₃ in solution decreases as the temperature of the solution decreases. FIG. 2 is based on information contained in E. Janecke, "Singulare Faite des Natriumnitrates," Z. Anorg. Che., volume 188, pages 72–85 (1930).

DESCRIPTION OF THE PREFERRED EMBODIMENTS

Figure 1:
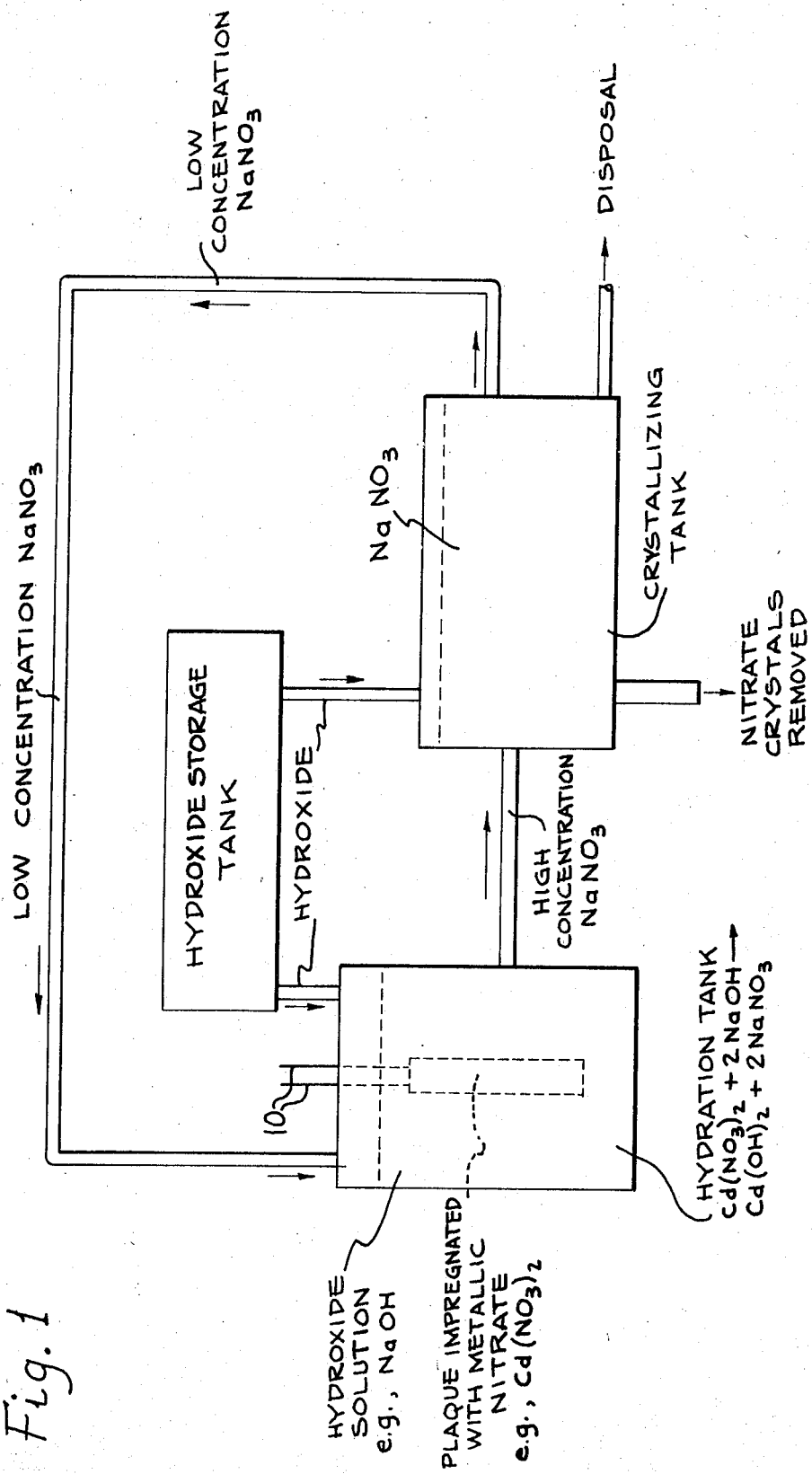
FIG. 1 is a schematic flow diagram of the process of this invention.

This invention concerns a process for hydrating a plaque impregnated with a metal nitrate in a hydroxide solution. The invention is applicable to a variety of metal nitrates, including the nitrates of cadmium, silver, cobalt, and nickel, and is also applicable to different hydroxide solutions, including those of sodium and potassium. For simplicity the remainder of this description will be given using cadmium nitrate and sodium hydroxide in the illustrations, but it should be understood that the invention is by no means limited to these two materials.

FIG. 1 is useful in explaining the process. A plaque impregnated with a metal nitrate, $Cd(NO_3)_2$, is submerged into a hydroxide solution, NaOH in a hydration tank where the plaque is hydrated,

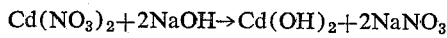

$$Cd(NO_3)_2 + 2NaOH \rightarrow Cd(OH)_2 + 2NaNO_3$$

For reasons stated in the background section above this hydration is done using a hot, concentrated hydroxide solution. The hydration reaction may be speeded up by passing a current through the electrode and for this reason FIG. 1 shows a pair of conducting wires 10 connected to the plaque, but these wires and the current which they carry are not essential to the hydration reaction.

The hydroxide solution containing the NaNO₃ byproduct is passed from the hydration tank to a crystallizing tank where the nitrate is cooled to produce crystals. In the simplest batch process using this invention, the solution remaining in the crystallizing tank is then disposed of by dumping, this solution being less polluting and less wasteful of nitrate than if the highly concentrated nitrates coming from the hydration tank had been dumped. In a more elaborate but still batch process, the solution coming out of the crystallization tank can be returned to the hydration tank where its addition can extend the time or life of the batch. FIG. 1 shows both the disposal and return alternatives.

Except for occasions when the process must be shut down and by-products disposed of because of excessive accumulation of impurities other than nitrates, the process may be made continuous by the addition of proper amounts of hydroxide and water. In one form of the invention, hydroxide is added to the hydration tank at a rate just sufficient to maintain both the hydroxide concentration and the liquid level in the hydration tank, and the solution remaining in the crystallizing tank after crystals have been formed is dumped rather than being returned to the hydration tank; with this an additional and alternative feature is the addition of hydroxide to the crystallizing tank to increase the rate and amount of nitrate crystallization. In another embodiment of the invention the solution remaining in the crystallizing tank after crystals have been formed is returned to the hydration tank rather than being dumped; and again hydroxide may be added to the crystallizing tank, this time either in addition to or as an alternative for the hydroxide shown in FIG. 1 being added to the hydration tank. Constant concentrations of both hydroxides and nitrates may be maintained in the hydration tank, and the nitrate concentration of the solution coming from the crystallizing tank may be kept low, regardless of whether that solution is simply dumped or is returned to the hydration tank, but of course the quantities of materials required as inputs will vary depending upon whether the solution is dumped or reused. FIG. 1 is intended to show all alternatives of continuous as well as of batch processing.

FIG. 2, which shows the solubility of sodium nitrate in hydroxide solutions of various temperatures and concentrations, is relevant to both the hydration tank and the crystallizing tank. The necessity for using hot, concentrated hydroxide solutions in the hydration tank was explained in the background above and is illustrated graphically in FIG. 2. The reverse of the hydration tank reasoning applies to the crystallizing tank where it is desired to solidify the NaNO₃ rather than to dissolve it. The desirability of having a cooler but even higher NaOH concentration liquid in the crystallizing tank than in the hydration tank becomes apparent from FIG. 2.

Having explained our invention, we claim:

1. The method of hydrating a battery plaque impregnated with a metal nitrate in a hydroxide solution and the subsequent recovery of nitrate byproducts as crystals comprising the steps of:
   (a) hydrating a battery plaque and producing a liquid nitrate byproduct by submerging a plaque impregnated with a metal nitrate into a hydroxide solution contained in a hydration tank, the metal nitrate being selected from the group consisting of cadmium nitrate, silver nitrate, cobalt nitrate and nickel nitrate;
   (b) passing the hydroxide solution containing the nitrate byproduct from the hydration tank into a crystallizing tank at a rate which will maintain the concentration of the nitrate byproduct in the hydration tank at a substantially constant level;
   (c) cooling the solution in the crystallizing tank to produce nitrate crystals and a remaining solution in the crystallizing tank;
   (d) removing the nitrate crystals from the crystallizing tank; and,
   (e) removing the remaining solution from the crystallizing tank.

2. The method of claim 1 in which the solution removed from the crystallizing tank subsequently is returned to and mixed with the hydroxide solution in the hydration tank.

3. The method of claim 1 in which additional hydroxide solution is added to the hydration tank while the hydroxide solution containing the nitrate byproduct is passing into the crystallization tank, the addition of hydroxide solution being at a rate which will maintain the hydroxide concentration in the hydroxide tank at a substantially uniform level.

4. The method of claim 2 in which additional hydroxide solution is added to the hydration tank while the hydroxide solution containing the nitrate byproduct is passing into the crystallization tank, the addition of hydroxide solution being at a rate which will maintain the hydroxide concentration in the hydration tank at a substantially uniform level.

5. The method of claim 1 in which additional hydroxide solution is added to the hydroxide solution containing the byproduct being passed into the crystallizing tank and in which the solution removed from the crystallizing tank is subsequently returned to and mixed with the hydroxide solution in the hydration tank, the total additional hydroxide being added being sufficient to maintain the hydroxide concentration in the hydration tank at a substantially uniform level.

6. The method of claim 1 in which additional hydroxide solution is added both to the hydration tank and to the hydroxide solution containing the nitrate byproduct being passed into the crystallizing tank and in which the solution removed from the crystallizing tank is subsequently returned to and mixed with the hydroxide solution in the hydration tank, the total additional hydroxide being added being sufficient to maintain the hydroxide concentration in the hydration tank at a substantially uniform level.

References Cited

UNITED STATES PATENTS

| | | | |
|---|---|---|---|
| 2,155,854 | 4/1939 | Barnes et al. | 134—13 |
| 3,443,991 | 5/1969 | Kremm | 134—13 |
| 1,531,336 | 3/1925 | Halvorsen et al. | 23—102 |
| 2,010,046 | 8/1935 | Wilson | 23—102 |
| 2,115,857 | 5/1938 | Kaselitz | 23—102 |
| 3,314,822 | 4/1967 | Jost | 136—24 |
| 3,356,534 | 12/1967 | Ackermann | 136—24 |
| 3,505,113 | 4/1970 | Merten et al. | 136—28 |

WINSTON A. DOUGLAS, Primary Examiner

C. F. LEFEVOUR, Assistant Examiner

U.S. Cl. X.R.

136—24, 29, 78